United States Patent [19]

Dhong et al.

[11] Patent Number: 5,185,719
[45] Date of Patent: Feb. 9, 1993

[54] HIGH SPEED DYNAMIC, RANDOM ACCESS MEMORY WITH EXTENDED RESET/PRECHARGE TIME

[75] Inventors: Sang H. Dhong, Mahopac; Wei Hwang, Armonk, both of N.Y.

[73] Assignee: International Business Machines Corp., Armonk, N.Y.

[21] Appl. No.: 545,797

[22] Filed: Jun. 29, 1990

[30] Foreign Application Priority Data

Oct. 14, 1989 [JP] Japan .................................. 1-267140

[51] Int. Cl.$^5$ ............................................. G11C 13/00
[52] U.S. Cl. ............................... 365/189.01; 365/203; 365/193; 365/230.01
[58] Field of Search ................... 365/189.01, 203, 193, 365/203, 189.04, 189.05, 230.01

[56] References Cited

U.S. PATENT DOCUMENTS

| | | | |
|---|---|---|---|
| 4,376,989 | 3/1983 | Takemae | 365/230 |
| 4,602,356 | 7/1986 | Nozaki et al. | 365/230 |
| 4,608,666 | 8/1986 | Uchida | 365/182 |
| 4,618,947 | 11/1986 | Tran et al. | 365/230 |
| 4,636,989 | 1/1987 | Ikuzaki | 365/222 |
| 4,638,462 | 1/1987 | Rajeevakumar et al. | 365/203 |
| 4,672,587 | 6/1987 | Gieger et al. | 365/230.01 |
| 4,697,108 | 9/1987 | Chappell et al. | 307/475 |
| 4,722,074 | 1/1988 | Fujishima et al. | 365/203 |
| 4,725,945 | 2/1988 | Kronstadt et al. | 364/200 |
| 4,754,433 | 6/1988 | Chin et al. | 365/189 |
| 4,758,987 | 7/1988 | Sakui | 365/189 |
| 4,787,067 | 11/1988 | Takemae et al. | 365/222 |
| 4,800,531 | 1/1989 | Dehganpour et al. | 365/222 |

FOREIGN PATENT DOCUMENTS 0017862  4/1980  European Pat. Off. .
60-211696A 10/1985 Japan .
61-126683A  6/1986 Japan .
61-222089A 10/1986 Japan .
61-230697A 10/1986 Japan .

OTHER PUBLICATIONS

Kobayashi et al., "Session XIX: Dynamic RAMs", 1986 IEEE International Solid-State Circuits Conference, FAM-19.1, pp. 260-261.
Kobayashi et al., "A High-Speed 64Kx4 CMOS DRAM Using On-Chip Self-Timing Techniques", IEEE Journal of Solid-State Circuits, vol. SC-21, No. 5, Oct. 1986, pp. 655-660.
"Early Read of Dynamic RAM in an Intel 80286 Microprocessor-Based System", IBM Technical Disclosure Bulletin, vol. 31, No. 2, Jul. 1988, pp. 24-26.

Primary Examiner—Terrell W. Fears
Attorney, Agent, or Firm—Perman & Green

[57] ABSTRACT

A computer system is described which includes a DRAM having a plurality of memory cells arranged in rows and columns. The system includes a row address buffer, and circuitry for generating a row address strobe signal that exhibits both active and inactive levels during each DRAM memory cycle and first and second transitions between those levels. A read-in circuit causes read-in of a row address to the DRAM's row address buffer. A delay circuit is responsive to a delayed lagging transition of a row address strobe signal to provide an extended duration control signal which delays an output from the row address buffer. A reset/precharge circuit is active during both the inactive row address strobe signal and the extended duration control signal to reset and precharge circuits and memory cells in the DRAM.

5 Claims, 5 Drawing Sheets

HIGH SPEED DYNAMIC, RANDOM ACCESS MEMORY WITH EXTENDED RESET/PRECHARGE TIME

FIELD OF THE INVENTION

This invention relates to dynamic random access semiconductor memories (DRAM) and, more particularly, to a system for increasing the available time for row reset/precharge time in a DRAM.

BACKGROUND OF THE INVENTION

In modern DRAM's, an address system is employed in which row and column addresses are multiplexed through a set of address terminals in response to a pair of external clocks. The first clock generates a row address strobe ($\overline{RAS}$) and a second clock generates a column address strobe ($\overline{CAS}$). The benefit of this addressing technique is that the number of lines or terminals employed for address inputs to a chip are reduced by a half, thereby enabling a substantial reduction in required chip real estate for input/output terminals.

During a DRAM read/write cycle, the $\overline{RAS}$ signal is active for a portion of the time and inactive for another portion of the time. During its active state, it is at a logical low level and during its inactive state, it is at a logical high level. When the $\overline{RAS}$ signal is in its inactive state, presetting and recharging of the DRAM circuitry is accomplished to ready it for the next memory cycle. During this phase, word lines (i.e., X address lines) are restored from the active state (low logical level) to the standby state (high logical level)—assuming use of P-MOS access transistors for DRAM cells—an internal read-write cycle restores charges to memory cell storage capacitors; address buffers and sense amplifiers are reset; and bit lines are precharged.

DRAMS have seen wide usage in personal computers (PC). When a personal computer's clock is eight or ten mHz, most DRAMS are fast enough to keep up with the PC's central processing unit (CPU). If the CPU clock runs faster, a conventional DRAM is unable to keep up with the CPU's clock rate and system performance is thereby degraded.

In general, CPU performances are best when a memory access is accomplished in two CPU clock cycles. However, other system considerations often require additional clock cycles to be employed for memory accessing. For instance, in personal computers such as the IBM PS/2, a memory access is accomplished in three clock cycles. In such systems, the $\overline{RAS}$ signal is pulled to the high or inactive state shortly after the commencement of the first clock cycle and is pulled low to the active state at the beginning of the second clock cycle. During the period that the $\overline{RAS}$ signal is in the inactive state, the DRAM executes the reset/precharge action.

So long as the CPU operates with an eight or ten mHz clock, each clock cycle is, at least, 100 nanoseconds long and there is more than sufficient time to perform the DRAM's reset/precharge functions. However, if a 33 mHz CPU clock is used, then each CPU clock cycle is 30 nanoseconds and, a computer-generated RAS signal allows only approximately 20 nanoseconds for reset/precharge functions. This is inadequate for high speed DRAMS, which require a reset/-precharge time of 30 nanoseconds.

To avoid having to redesign the CPU's internal $\overline{RAS}$ generation functions and circuitry to accommodate a 33 mHz clock, various alternatives exist, none of which are attractive. The first is that a new chip can be designed with a faster reset/precharge time. This would be very difficult to achieve without using a more advanced (and expensive) CMOS technology. Similarly, an internal redesign of the PC could accomplish the same operation, however compatibility problems with other previously designed PC's would be created.

Others have attempted to cope with this problem by employing an extended, on-chip internal precharge cycle which commences upon the rise of the $\overline{RAS}$ signal from its low (active) to its high (inactive) state. This on-chip-created cycle is implemented by a clock chain and causes an extension of the $\overline{RAS}$ inactive time, to enable both DRAM resetting and recharging. This implementation, while enabling use of standard CPU-generated $\overline{RAS}$ signals, utilizes a long timing chain that is triggered by the start of the $\overline{RAS}$ low to high signal transition. As a result, the timing chain must constantly create a time-out period for the entire $\overline{RAS}$ reset/precharge time. Timing inaccuracies occur in the timing chain due to variabilities in delay arising from temperature variations, manufacturing anomalies etc. Such an implementation is described by Kobayashi et al. in "A 47ns 64KW by 4b CMOS DRAM With Relaxed Timing Requirements", Proceedings of the 1986 IEEE International Solid-State Circuits Conference, pp. 260, 261, and in "A High Speed 64k by 4 CMOS DRAM Using On-Chip Self-Timing Techniques", IEEE Journal of Solid-State Circuits, Vol. SC-21, No. 5, October, 1986, pp. 655–660.

Other prior art in this area is as follows:

U.S Pat. No. 4,602,356 issued Jul. 22, 1986 to Noyaki et al., entitled "Semiconductor Memory Device", describes a semiconductor memory device that operates under a so called address multiplex access method. A row part of the device is enabled by receiving a row address strobe signal. A column part of the device is enabled by simultaneously receiving both a column address strobe signal and a timing control signal supplied from the row part during its enable state. A column address buffer in the column part is enabled by simultaneously receiving both the column address strobe signal and a timing control signal. The timing control signal is produced from a circuit when it detects and holds the row address strobe signal.

U.S. Pat. No. 4,608,666 issued Aug. 26, 1986 to Uchida entitled "Semiconductor Memory", discloses a large capacity and high speed semiconductor memory. Static memory cell rows are provided so as to correspond to dynamic memory cell rows in a dynamic memory cell array. Information is transferred with transfer means between static memory cells in the static memory cell rows and dynamic memory cells corresponding thereto. Access for a read/write operation externally required is effected to static memory cell rows.

U.S. Pat. No. 4,638,462 issued Jan. 20, 1987 to Rajeevakumar et al., entitled "Self-Timed Precharge Circuit", discloses a self-timed precharge circuit for a memory array. The circuit consists of an X-line complement circuit connected to the outputs of a plurality of falling edge detectors, and a precharge generator circuit connected to the output of the X-line complement circuit. Each falling edge detector is connected to a separate wordline of the system memory array. In operation, the precharge generator circuit is triggered with a signal on the output lead from a falling edge detector which is activated when the selected wordline connected thereto resets.

U.S. Pat. No. 4,636,989 issued Jan. 13, 1987 to Ikuyaki, entitled "Dynamic MOS Random Access Memory", discloses a DRAM which is accessed in response to an address strobe signal, has an automatic refresh circuit which consists of a clock generator that generates refresh clock pulses when the address strobe signal is not produced, and an address counter that increments a refresh address by counting the refresh clock pulses. Information retained in memory cells is automatically refreshed by an operation of the automatic refresh circuit. The DRAM of this arrangement does not need a special external terminal for the refresh operation and an external circuit associated therewith. Thus, the random access memory of this arrangement constructs, in effect, a pseudo static random access memory.

U.S. Pat. No. 4,376,989 issued Mar. 15, 1983 to Takemae, entitled "Semiconductor Dynamic Memory", describes a DRAM including a plurality of functional blocks or interface circuits for controlling the memory, such as a row-enable buffer, a row-address buffer, a word decoder, a column-enable buffer, a column-address buffer, and a column decoder. The functional blocks in the DRAM are sequentially reset by signals from the subsequent functional block so that the power operations of the functional blocks of the subsequent stages is indicated by the reset signal, and thus are returned to the state in which they are ready to execute the next processing.

U.S. Pat. No. 4,618,947 issued Oct. 21, 1986 to Tran et al., entitled "Dynamic Memory With Improved Address Counter For Serial Modes", discloses a DRAM that has serial data input/output modes, such as the so-called nibble, byte or extended nibble modes. This device employs improved address counter circuitry to access data from a selected row. An initial column address is latched when a serial mode is initiated, and the counter steps through the programmed number of bits, starting at the initial address. The number of bits used in the serial mode may be selected by metal-mask programming. To avoid a speed penalty, look-ahead circuitry initiates the set up for serial mode before the controls for this mode are detected.

U.S. Pat. No. 4,725,945 issued Feb. 16, 1988 to Kronstadt et al., entitled "Distributed Cache In Dynamic Rams", discloses a microcomputer memory system that is organized into a plurality of banks. Each bank consists of an array of static column mode, DRAMS of the type having an on-chip static buffer for storing an entire row. The static buffers associated with each bank function as a distributed cache to hold the last accessed row for the associated bank. A memory controller receives real addresses from a CPU or other device on the memory bus and extracts bank and row numbers from the address. The memory controller determines whether the accessed row for a memory bank is in the distributed cache and, if it is, accesses the distributed cache for that bank. Otherwise, the memory controller switches the contents of the distributed cache with the contents of the addressed row for that bank.

U.S. Pat. No. 4,722,074 issued Jan. 26, 1988 to Fujishima et al., entitled "Semiconductor Storage Unit With I/O Bus Precharging and Equalization", describes a first precharging and equalizing circuit that precharges and equalizes I/O buses in advance to selection of bit lines, and following thereto, a second precharging and equalizing circuit precharges and equalizes the I/O buses during driving operation of a sense amplifier. Thus, potential levels of the I/O buses are prevented from being changed by vibration of the output level of the sense amplifier transmitted to the I/O buses through parasitic capacitance during driving operation of the sense amplifier.

U.S. Pat. No. 4,754,433 issued Jun. 28, 1988 to Chin et al., entitled "Dynamic RAM having Multiplexed Twin I/O Line Pairs", describes a DRAM including a first and second input/output (I/O) bus, a first and a second I/O sense amplifier, and a first and a second I/O bus precharge circuit. A control circuit is responsive to the state of a mode control signal for enabling the operation of the I/O buses and the precharge circuits such that in one mode of operation, the DRAM operates in a conventional single bit per $\overline{CAS}$ cycle page mode. In a second mode of operation, a high speed dual bit per $\overline{CAS}$ cycle page mode is achieved wherein the I/O buses are alternately enabled, one being enabled when $\overline{CAS}$ is asserted and the other being enabled when $\overline{CAS}$ is deasserted. The dual bit mode of operation provides also for precharging the I/O bus which is not enabled during the period when the other bus is enabled. Thus, in the dual bit mode of operation, data transfers to or from the DRAM occur both when $\overline{CAS}$ is asserted and also when $\overline{CAS}$ is deasserted, thereby doubling the data transfer rate over that of the conventional page mode of operation.

U.S. Pat. No. 4,800,531 issued Jan. 24, 1989 to Dehganpour et al., entitled "Address Buffer Circuit For A DRAM", discloses a DRAM that has an input address buffer in which the first stage is a NOR gate. The output of the NOR gate is clocked to a latch which is preset to the slow condition of the NOR gate. The NOR gate is clocked separately from the clocking of the output of the NOR gate to the latch. A refresh control circuit has an output which is also clocked to the latch. The latch provides an internal address signal for selecting a word line. The internal address signal is representative of the output of the NOR gate when the DRAM is running a data cycle and is representative of the output of the refresh control circuit when the DRAM is running a refresh cycle.

U.S. Pat. No. 4,758,987 issued Jul. 19, 1988 to Sakui, entitled "Dynamic Semiconductor Memory With Static Data Storing Cell Unit", discloses a dynamic random access memory wherein memory cell word lines are provided substantially perpendicular to bit lines. Memory cells are provided at intersections of the bit lines and the memory cell word lines. Sense-amplifiers are connected to the bit line pair. Static memory cells are also connected to the bit lines and serve as an auxiliary memory. When a memory cell word line is selected, the static memory cells statically hold data voltages stored in an array of memory cells connected to the selected word line until another word line is selected. Thus, during a precharge period of the bit lines, the data voltages can be stored in the static memory cells. Therefore, even during the precharge period, data read/write is enabled.

Japanese Patent 60-211696 issued Oct. 24, 1985 to Miyazawa, entitled "Dynamic Ram", relates to a technique for reading a dynamic RAM at a high speed by lowering slightly a precharge level by means of a level adjusting circuit while synchronizing a selection action of a memory cell.

Japanese Patent 61-230697 issued Oct. 14, 1986 to Miyatake, entitled "Dynamic Semiconductor Memory Device", relates to a technique to shorten the access time and to attain a high-speed operation of a dynamic semiconductor memory device by lowering the precharging level of an address decoder circuit down to about half of the power supply voltage.

Japanese Patent 61-222089 issued Oct. 2, 1986 to Watanabe, entitled "Equalizing and Precharging Circuit", relates to a method and circuit to shorten access time and to stabilize reading operation by using a MOSFET for precharging in time division an active load having high resistance.

Japanese Patent 61-126683 issued Jun. 14, 1986 to Aono, entitled "Semiconductor Memory Device", discloses a circuit to decrease a delay due to a precharging and to make an action highly speedy by precharging a bit line with plural electric current paths.

European Patent Application no. 80101777.3 filed Apr. 3, 1980 by Shoji and published Oct. 29, 1980 discloses a memory device operable at high-speed and with low power consumption. In this device row address information and column address information are incorporated in synchronism with a row strobe signal and a column strobe signal, respectively, and refresh is effected in response to a row address. The device comprises a plurality of groups of selection gates for selectively supplying the incorporated column address information to a part of a plurality of column address decoders.

A publication in the IBM Technical Disclosure Bulletin, Vol. 31, No. 2, July 1988 at page 24, entitled "Early Read of Dynamic RAM in an Intel 80286 Microprocessor-Based System", describes a technique utilizing early read of DRAM in an Intel 80286 microprocessor-based system to eliminate the need for additional wait states during memory reads.

Accordingly, it is an object of this invention to provide a system which enables an extended reset/precharge time for a DRAM.

It is another object of this invention to provide a system for relaxing DRAM $\overline{RAS}$ reset/precharge times without requiring an alteration of the CPU generated $\overline{RAS}$ signal.

It is still another object of this invention to provide a system for relaxing a DRAM $\overline{RAS}$ reset/precharge time while providing a more accurate reset/precharge time than was heretofore available.

SUMMARY OF THE INVENTION

A computer system is described which includes a DRAM having a plurality of memory cells arranged in rows and columns. The system includes a row address buffer, and circuitry for generating a row address strobe signal that exhibits both active and inactive levels during each DRAM memory cycle and first and second transitions between those levels. A read-in circuit causes read-in of a row address to the DRAM's row address buffer. A delay circuit is responsive to a delayed lagging transition of a row address strobe signal to provide an extended duration control signal which delays an output from the row address buffer. A reset/precharge circuit is active during both the inactive row address strobe signal and the extended duration control signal to reset and precharge circuits and memory cells in the DRAM.

DETAILED DESCRIPTION OF THE INVENTION

Figure 1:
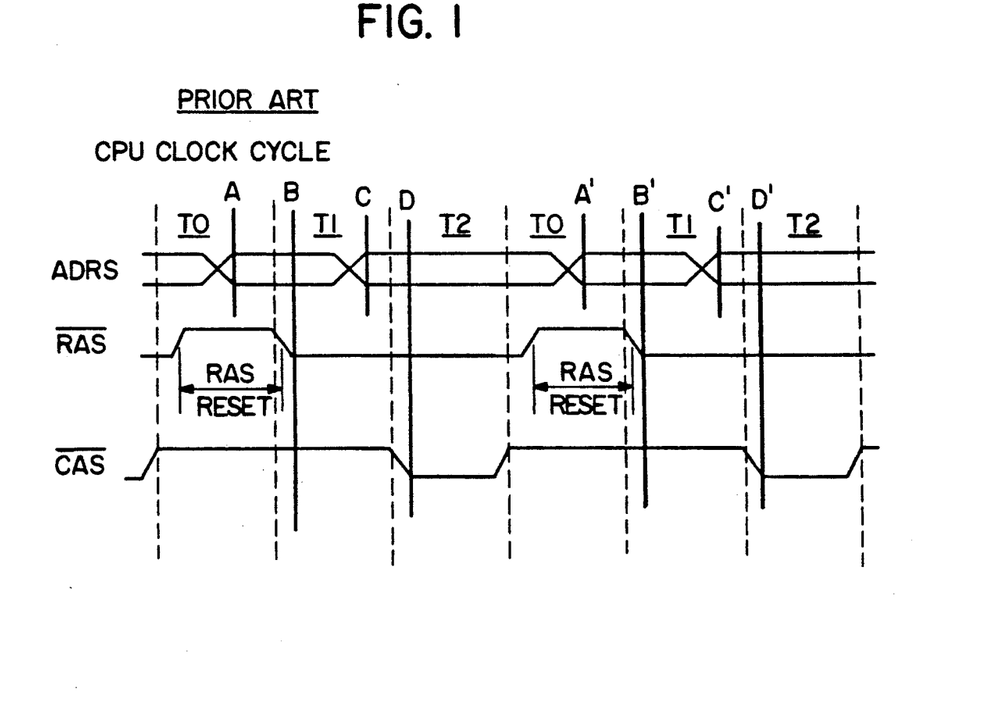
FIG. 1 is a timing diagram illustrating a prior art, three clock cycle memory access.

Referring now to FIG. 1, a waveform diagram of a prior art DRAM memory cycle is illustrated which employs three CPU clock cycles. Such DRAM operations are found in personal computers employing a microchannel configuration (e.g., IBM PS2). At the beginning of clock cycle T0, the RAS signal transitions from a low (active) level to the high (inactive) level and the RAS reset/precharge cycle commences. It is during this time that the resetting and precharging actions occur within the DRAM in preparation for the next read, write, or refresh cycle.

During the T0 clock cycle, the address lines transition to enable, at time A, addresses to be read into a DRAM controller register in preparation for read-in to the DRAM. At time B, the $\overline{RAS}$ signal transitions to the low level and the addresses in the DRAM controller register are read into a row address buffer on the DRAM chip. Subsequently, at time C, column addresses are read into a column address register in the DRAM controller. At the beginning of clock cycle T2, the column address strobe ($\overline{CAS}$) transitions to the low, active level and causes read-in of the column address signals into a column address buffer on the DRAM chip. Subsequently, the addresses are decoded and either read, write, or refresh actions occur.

As above stated, when a 33 mHz or higher clock is employed to operate the CPU, the time when the $\overline{RAS}$ signal is in the high, inactive state, is insufficient to allow a full reset/precharge of a high speed DRAM.

Figure 2:
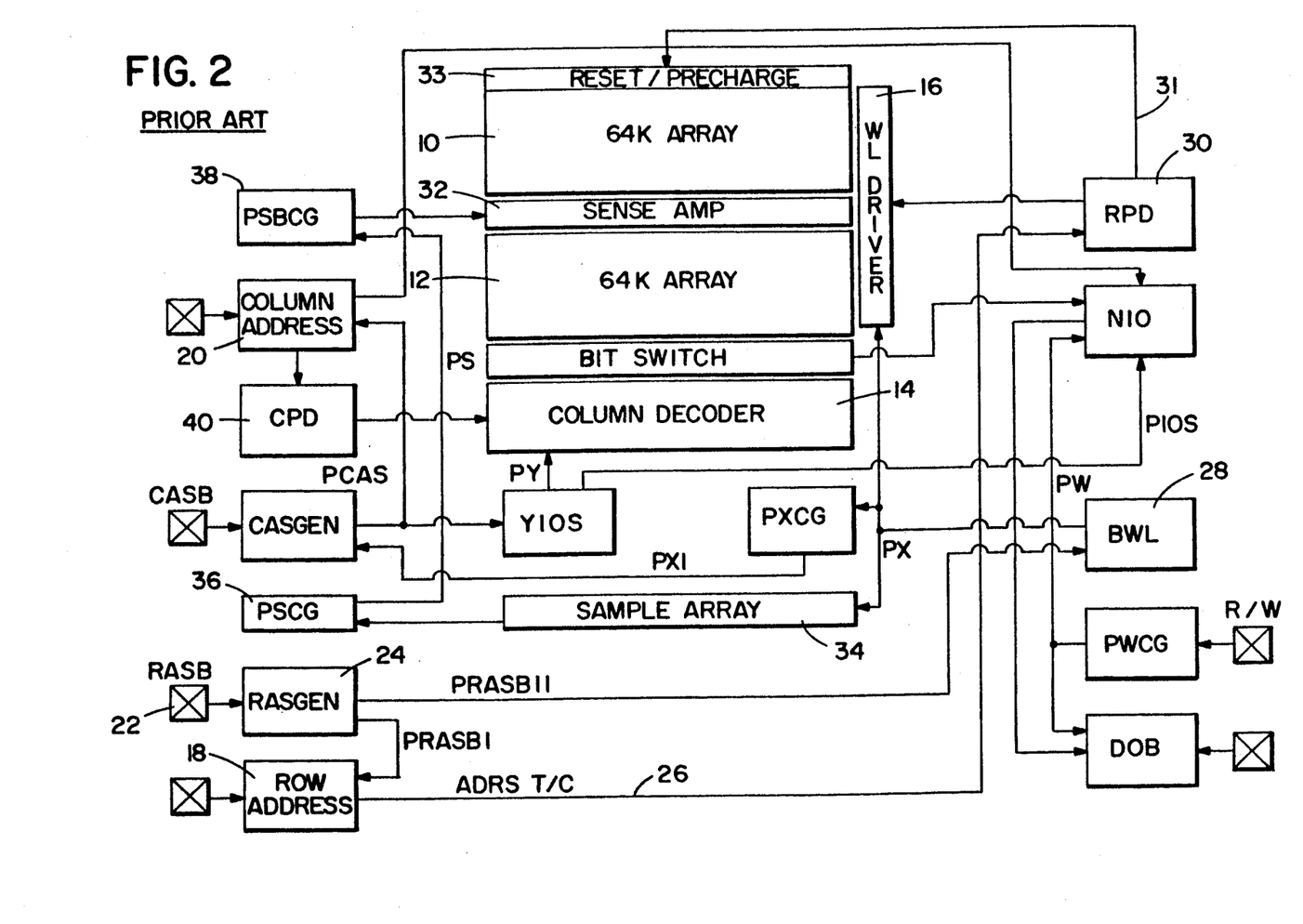
FIG. 2 is a block diagram of a prior art DRAM which operates in accordance with the timing chart of FIG. 1.

Referring to FIG. 2, a diagram of a prior-art high speed DRAM memory chip is illustrated which implements the waveforms of FIG. 1. A pair of 64K arrays of storage cells 10 and 12 are accessed by a column decoder 14 and a wordline (row) driver 16. Row addresses are received into row address buffer 18 and column addresses are received into column address buffer 20. A $\overline{RAS}$ signal, generated by the CPU, is applied via terminal 22 to RASGEN circuit 24 which, in turn, generates two signals. The first is a signal designated PRASBI which tells row address buffer 18 to latch the row (word) address signals. This occurs at time B in FIG. 1. Row address buffer 18 immediately manifests true and complement signals corresponding to the row addresses on line 26.

RASGEN circuit 24 also generates a signal denoted PRASBII (a signal that initiates a new memory cycle). The PRASBII signal causes a boost wordline clock (BWL) 28 to be triggered. In response, an output from BWL 28 is applied to wordline drivers 16 and sample array 34. The address true and complement signals on line 26 are decoded in row address decoder (RPD) 30 and applied to word line drivers 16. The output from BWL 28 causes the word lines to be gated to access arrays 12 and 16 in accordance with the decoded address signals and also causes the latching of read-out data in sense amplifiers 32.

The latching of sense amplifiers 32 is caused by an output from sample array 34 which, in turn, causes trigger latch clock (PSCG) 36 to transmit an output to sense amp latching clock 38 (PSBCG). The output from sense amp latching clock 38 locks the data signals from the selected cells into sense amplifiers 32.

Column addresses are fed from column address buffer 20 to a column predecoder 40 (CPD) and thence to column decoder 14 for operation during the memory cycle. A reset/precharge circuit 31 is responsive to an output from row address decoder 30, via line 31 to reset/precharge circuit 33 and enables that circuit to reset and precharge the memory circuits within arrays 10 and 12. The level on line 31 only provides an activating input to reset/precharge circuits 33 when the address inputs to decoder 30 are inactive. When the address circuits become active, reset precharge circuit 33 is deactivated. Since the circuit of FIG. 2 is in the prior art, its additional detailed operation will not be further described.

Figure 4:
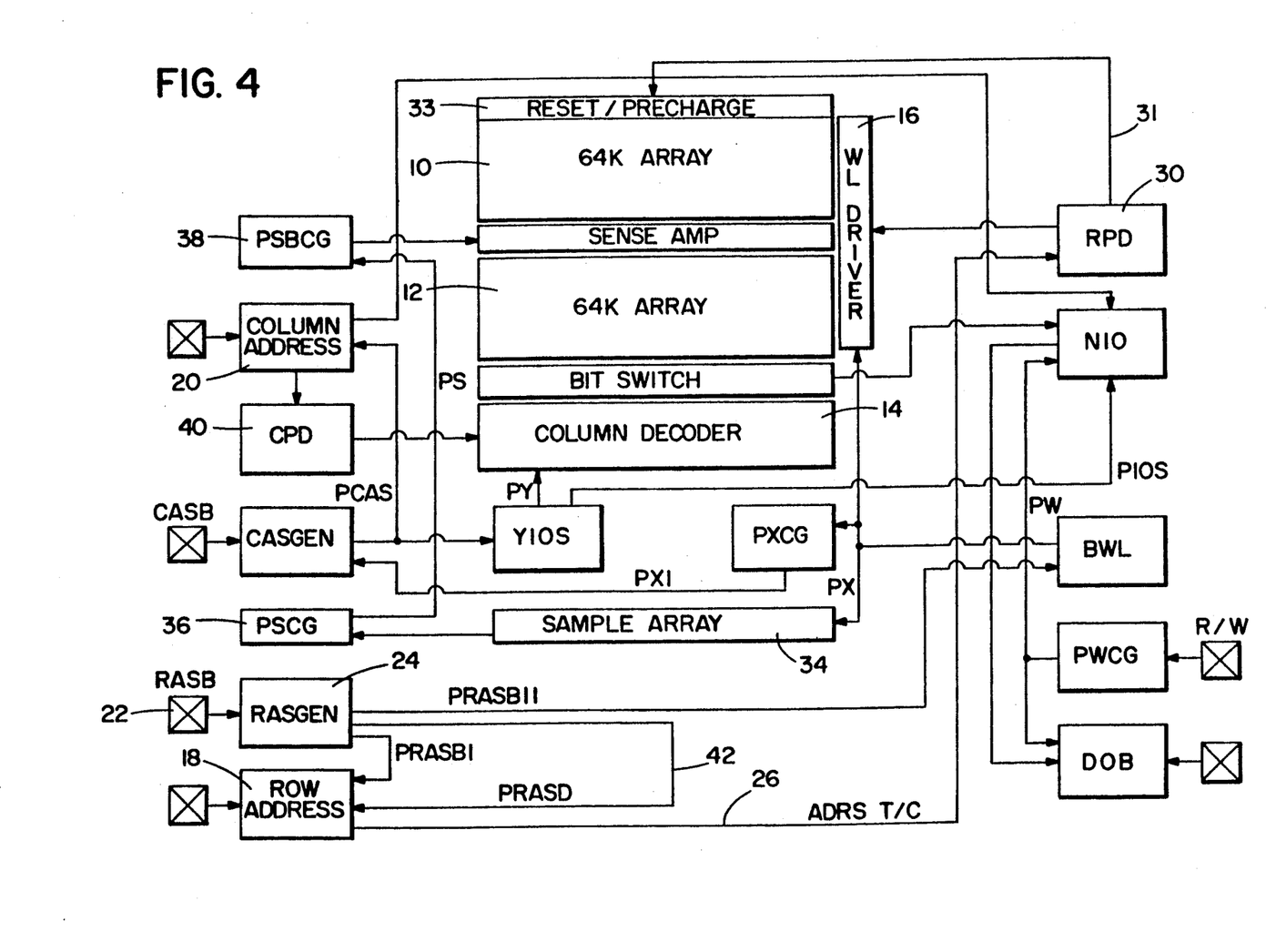
FIG. 4 is a block diagram of the DRAM of FIG. 2, modified to implement new signals shown in FIG. 3.

Turning now to FIG. 4, a DRAM is shown that incorporates the invention. In specific, RASGEN circuit 24 has been modified to provide a new signal PRASD, and the timing and functions of PRASBI and PRASBII have been changed. Row address buffer 18 now latches in row addresses when PRASBI becomes active. The outputs from row address buffer 18 (ADRS T/C) are delayed until activation of the PRASD signal on line 42 from RASGEN circuit 24. By delaying the PRASD and PRASBII control signals with respect to the RAS signal, the lagging transition of the previous row address strobe cycle is thereby extended.

Figure 3:
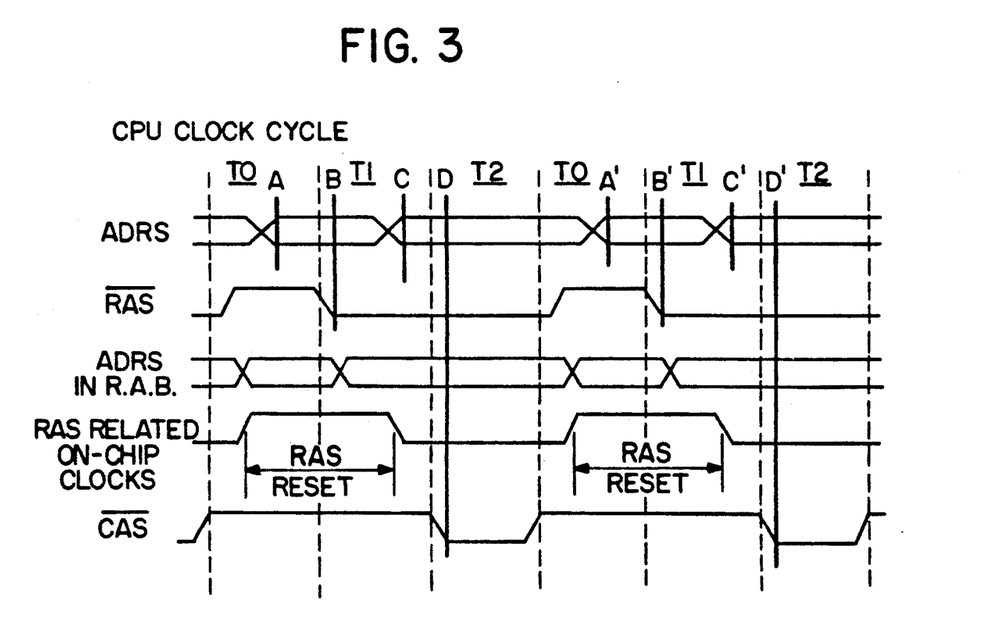
FIG. 3 is a timing chart which illustrates a three clock cycle memory access, and illustrates the invention.

In FIG. 3, it can be seen that the results of the PRASD and PRASBII signals is to cause an extension of the RAS reset/precharge waveform well into CPU clock cycle T1 substantially increasing the time available for the reset/precharge function.

Figure 5:
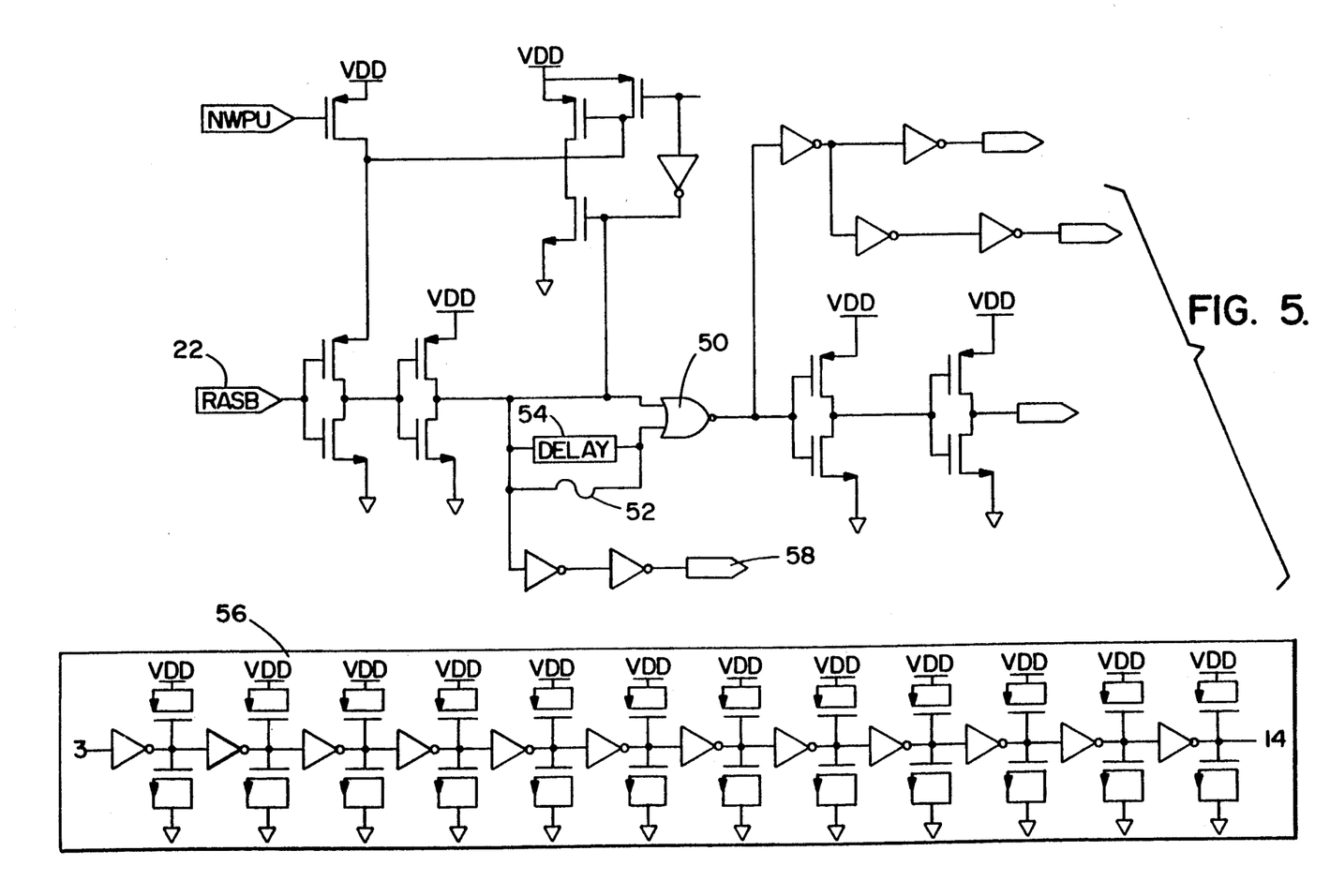
FIG. 5 is a schematic diagram of a RAS generator for providing the new timing signals shown in FIG. 4.

Referring now to FIG. 5, a schematic diagram is shown of RASGEN circuit 24 of FIG. 4. The $\overline{RAS}$ signal is applied via terminal 22, to transistors Q2 and Q1 and then through transistors Q6 and Q5 to node 3 and an input to NOR circuit 50. So long as a NOR condition is present at the inputs to NOR circuit 50, its output is at an active level. This causes the PRASBI, PRASBII, and PRASD signals to be at the high or inactive state.

For a three cycle memory operation, fuse 52 is blown, and causes a signal appearing at node 3 to be applied through delay circuit 54 to an input to NOR circuit 50. (The details of delay circuit 54 are shown expanded at 56 in FIG. 5). Consequently, an active output at node 5 from NOR circuit 50 is present only after the level at node 3 transitions from the high state to the low state (indicating the termination of the $\overline{RAS}$ reset/precharge state) and that transition is delayed and arrives at NOR circuit 50 via delay 54. Since node 3 has the same polarity as $\overline{RAS}$ input 22, the PRASD and PRASBII signals derived when node 5 transitions to the active state, are activated at the end of the delayed $\overline{RAS}$ signal. In contrast, the PRASBI signal appearing at node 58 is activated when node 3 goes low and immediately causes the row addresses in row address buffer 18 to be latched.

If a two cycle memory is employed, fuse 52 is not blown and the circuit operates as the prior art circuit shown in FIG. 2.

Figure 6:
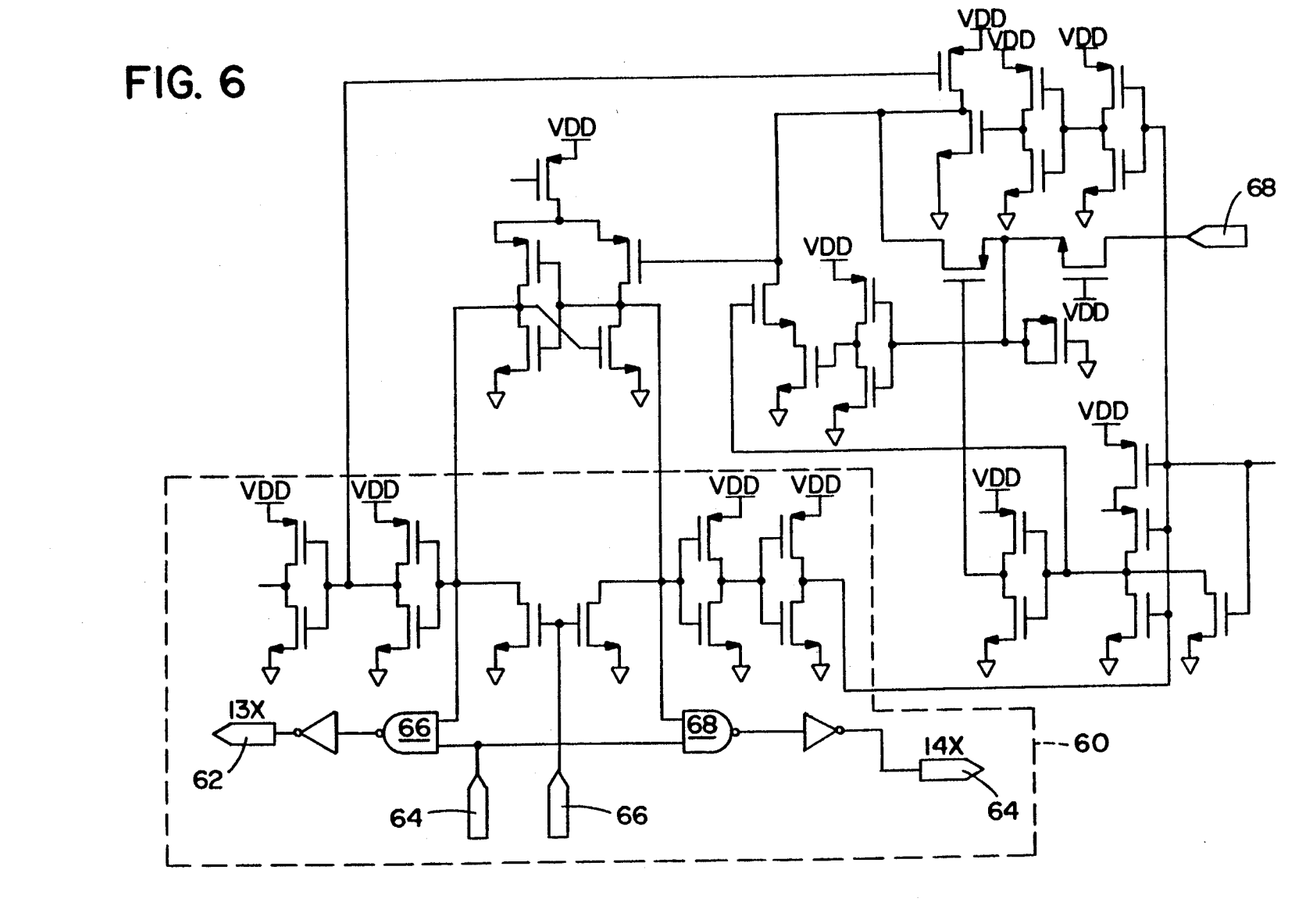
FIG. 6 is a schematic diagram of row address circuits used in the block diagram of FIG. 4.

In FIG. 6, a schematic diagram of row address buffer circuit 18 is shown. The circuit is modification of a prior circuit shown in U.S. Pat. No. 4,697,108 to Chappell et al. The modified portion is shown in dotted box 60. The address true and complement signals appear at terminals 62 and 64 respectively. They are gated by the PRASD signal appearing on terminal 64 through NAND GATES 66 and 68. As soon as the PRASBI signal on terminal 66 is activated, the circuit latches the addresses appearing on row address input 68. The address true and complement outputs on terminals 62 and 64 do not become active until the PRASD signal on terminal input 64 is asserted.

It can be seen from the above, that the $\overline{RAS}$ reset/precharge time is extended by an on-chip generated control signal derived from NOR circuit 50 in FIG. 5. That output and its duration is controlled by the fall at node 3 of the $\overline{RAS}$ signal and its time delay through delay circuit 54. Thus the extension by the delay circuit is only a fraction of the $\overline{RAS}$ reset time, thus enabling more accurate timing of the $\overline{RAS}$ cycle.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

We claim:

1. In a computer system including a DRAM having a plurality of memory cells arranged in rows and columns, the combination comprising:
    row address buffer means;
    circuit means for generating a row address strobe signal which exhibits both active and inactive levels during each DRAM memory cycle, and first and second transitions between said levels;
    read-in circuit means, for reading in a row address to said row address buffer means;
    delay means responsive to a delayed lagging transition of said row address strobe signal to generate an extended duration control signal which delays an output from said row address buffer means; and
    reset circuit means active when said inactive level is manifested by said row address strobe signal and for the extended duration of said control signal, to cause resetting and precharging of said DRAM.

2. The system as recited in claim 1 wherein said computer employs a three clock cycle for each read/write operation of said DRAM, said row address strobe signal exhibiting a first transition to said inactive level in one said clock cycle and a second transition to said active level at the beginning of a next clock cycle, said control signal exhibiting a transition from said inactive level to said active level later in said next clock cycle than said row address strobe signal.

3. The system as recited in claim 1 wherein read-in circuit means is responsive to a transition of said control signal from said inactive level to said active level, to commence read-in of a row address.

4. The system as recited in claim 3 wherein said inactive level is a high potential level and said active level is a low potential level.

5. A system as recited in claim 2, wherein said delay means comprises:

an OR logical circuit having a pair of inputs, one said input receiving said row address strobe signal and another receiving a delayed row address strobe signal, said OR logical circuit producing said extended duration control signal from the transition of said row address strobe signal from its active to inactive level, until a transition of said delayed row address signal from its inactive level to its active level.

* * * * *